United States Patent Office.

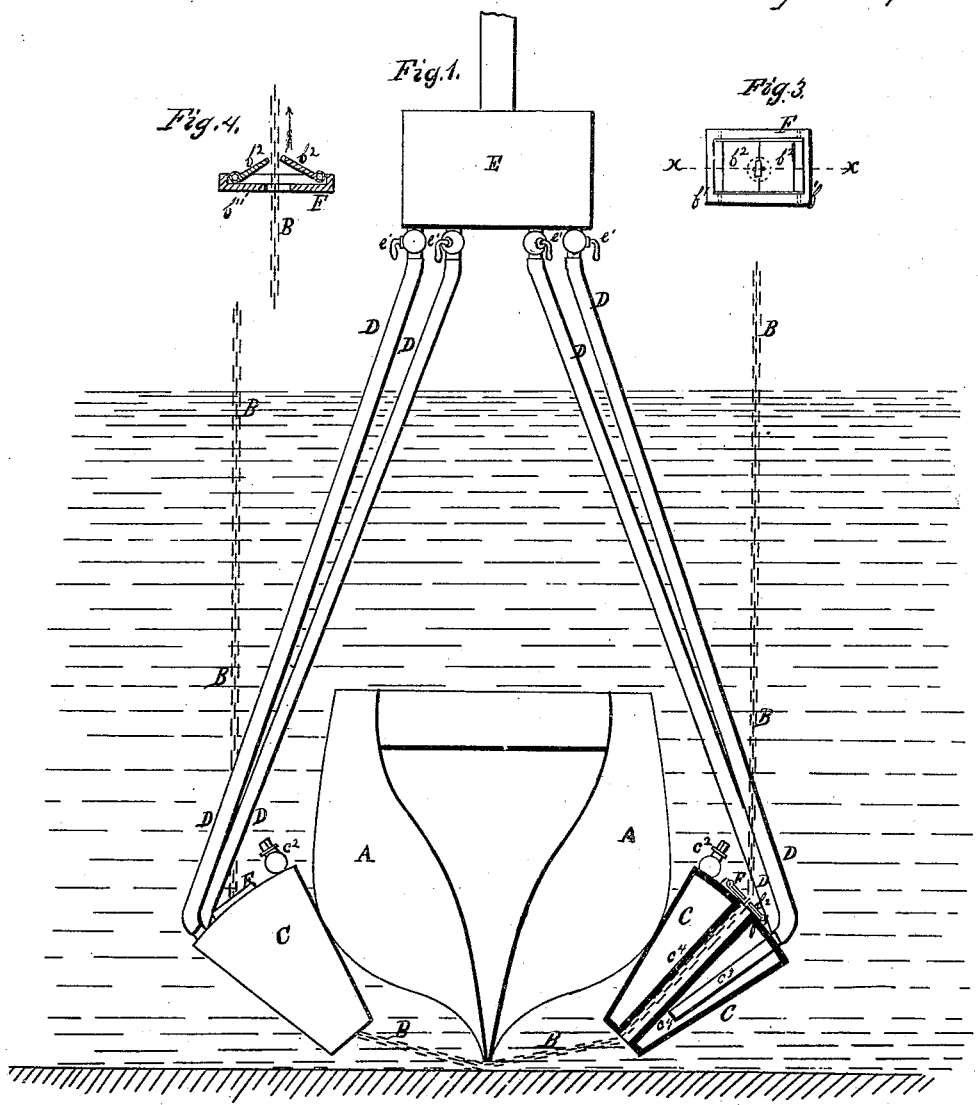

RICHARD W. HALLETT, OF HUDSON CITY, NEW JERSEY.

Letters Patent No. 68,501, dated September 3, 1867.

IMPROVED APPARATUS FOR RAISING SUNKEN VESSELS.

*The Schedule referred to in these Letters Patent and making part of the same.*

TO ALL WHOM IT MAY CONCERN:

Be it known that I, RICHARD W. HALLETT, of the city and county of Hudson, and State of New Jersey, have invented a new and improved Apparatus for Raising Sunken Vessels; and I do hereby declare that the following is a full, clear, and exact description thereof, which will enable those skilled in the art to make and use the same, reference being had to the accompanying drawings, forming part of this specification, in which—

Figure 1 represents my improved apparatus as attached to a sunken vessel, partly in section, to show the construction of the air-chambers.

Figure 2 is a longitudinal section of one of the air-chambers.

Figure 3 is a detail top view of one of the clutches by which the air-chambers are prevented from rising along the chains.

Figure 4 is a detail section of the same, taken through the line $x\ x$, fig. 3.

Similar letters of reference indicate corresponding parts.

My invention has for its object to furnish an improved apparatus, by means of which sunken vessels may be easily raised to the surface of the water and floated to any desired place; and it consists in the construction of the air-chambers, and in the manner in which they are applied to the hulls of the sunken vessels.

A represents a sunken vessel. B are chains, which are let down from a vessel moored above, and which are passed beneath the sunken vessel and arranged in pairs, at suitable distances apart, to receive the air-chambers C. The air-chambers C are constructed substantially in the shape shown in the drawings. $c^1$ are holes or openings through the bottom of said air-chambers, for the ingress and egress of the water. $c^2$ are stop-cocks, attached to the upper sides of the air-chambers, to allow the escape of the air when it is desired to sink the air-chambers to their places. $c^3$ are pipes, extending from the top of the air-chambers nearly to their bottom, to the projecting ends of which pipes are attached the lower ends of the flexible tubes D, the upper ends of which are attached to the air-chambers E, into which air is forced by an air-pump operated by a steam engine. Each of the tubes D, at the point where it communicates with the air-chamber E, is provided with stop-cocks $e'$, by which the admission of air into the air-chambers C is regulated, as the circumstances of each case may require. $c^4$ are pipes extending through the air-chambers C from top to bottom, which are made air and water-tight, and at least two of which should be made in each chamber. F are clutches, placed upon the chains B above the air-chambers C, and which are so constructed, as shown in the drawings, as to slide freely down the chains as the air-chambers sink; but when the air-chambers attempt to rise they clutch the chains and prevent the said air-chambers from moving up the said chains. The clutches consist of a plate, $f$, sufficiently heavy to sink freely through the water, and having a hole through its centre, for the passage of the chain. $f^3$ are two plates, pivoted at their outer edges to the upper side of the plate $f^1$, and having notches formed in their inner edges, to fit upon and clutch the chain, as shown in fig. 1.

In using the apparatus, the wrecking-vessel is moored directly over the sunken vessel, or as nearly so as possible. The chains B are then let down and passed beneath the hull of the sunken vessel. The ends of the chains are then passed through the pipes $c^4$ of the air-chambers, and through the clutches F, and the said air-chambers lowered into the water. By opening the stop-cocks $c^2$ the air within said air-chambers will escape as the water enters through the openings in their bottoms. When enough water has entered the air-chambers to sink them to the bottom, the stop-cocks $c^2$ are closed, and the air-chambers C, followed by the clutches F, are allowed to slide down the chains B to their places upon or beneath the sides of the sunken vessel, as shown in fig. 1, from which position they are prevented from rising by the clutches F. When the air-chambers C are all adjusted in place, and the stop-cocks $c^2$ are all closed, air is forced at the same time into all the chambers C, through the flexible pipes or tubes D, until enough has been forced in to raise the sunken vessel, the stop-cocks $e'$ enabling the admission of the air into the different chambers to be regulated as the circumstances of the case may require.

*Claim.*

I claim as new, and desire to secure by Letters Patent—

1. The air-chambers C, constructed substantially as herein described, in combination with the chains B, flexible tubes D, and air-chamber E, as and for the purpose herein shown and set forth.

2. The combination of the clutches F, or their equivalent, with the chains B and air-chambers C, substantially as herein shown and described, and for the purpose set forth.

The above specification of my invention signed by me this 7th day of May.

R. W. HALLETT.

Witnesses:
WM. F. MCNAMARA,
JAMES T. GRAHAM.